Patented Dec. 12, 1933

1,938,927

UNITED STATES PATENT OFFICE 1,938,927

ALDEHYDE PROTEID COMPOSITION

Erik Rosenberg Nielsen, Chicago, Ill., assignor to Charles H. Joy, Jr., Chicago, Ill.

No Drawing. Application May 22, 1931
Serial No. 539,419

11 Claims. (Cl. 106—38)

This invention relates to a new method of preparing aldehyde-proteid compositions having special utility in connection with the preparation of proteid compositions whose melting points or solubilities must be modified by treatment with an aldehyde agent.

An object of this invention is to provide a convenient means of controlling and facilitating the reaction between aldehydes such as formaldehyde or furfuraldehyde and proteid substances such as glue or casein.

In the manufacture of products such for example as duplicating rolls in which the composition consists mainly of glue, glycerine and water, it is necessary to raise the melting point of the composition and render the surface non-adhesive by a slight hardening of the glue. The allowable variation in melting point is comparatively narrow since if the composition has too high a melting point, the copies will be dim and if the melting point is too low, the surface will be too sticky for convenient handling and the composition will flow in warm weather.

If formaldehyde is added to a mixture of glue, glycerine and water, such as is ordinarily used in this art, the reaction takes place very slowly and the melting point of the glue and consequently the number of good copies obtainable continues to change during a period of several months. This is obviously an unsatisfactory condition since it results in the marketing of merchandise of undependable quality.

I have discovered, however, that if the pH of the glue, glycerine and water mixture be adjusted within fairly narrow limits of alkalinity at the time of or immediately after the addition of the formaldehyde and if, after the formaldehyde is added, the liquid mixture is poured and chilled within a relatively short time to a temperature below its melting point and then stored at ordinary room temperature, the reaction as measured by the increase in melting point of the composition will be practically completed in one week whereas in the case of a mixture of identical composition except that its pH is below 7.0, the hardening will be so very slow that it will not be complete until after several months of storage.

Practically all commercial glues have a pH below 7.0 and this is true also of the grades of glycerine commonly used in the manufacture of duplicating rolls so that in order to make certain of complying with the requirements of my new process, it is necessary either to select deliberately a glue of abnormal composition or to add to the mixture a sufficient quantity of an alkaline agent such for example as sodium hydroxide in order to produce the necessary degree of alkalinity in the composition. While any pH above seven is distinctly beneficial in accelerating the rate of hardening, I have found it preferable ordinarily to adjust the pH of my composition to between 8.3 and 8.8, for example 8.5. Useful results may be obtained with alkaline glue mixtures outside this pH range but below it the action is not so rapid and above it there is a tendency for the glue to be adversely affected by the action of the alkali.

A typical composition of this sort may be prepared by dissolving 10 lbs. of ordinary commercial glue (10—10 grade) in 25 lbs. of water and then mixing in 65 lbs. of glycerine together with suitable pigment such as zinc sulphide if an opaque material is desired. This mixture is held at a temperature somewhat above its melting point, for example 140° F. and the required amount of formaldehyde is added preferably dissolved in water or glycerine for which purpose a portion of the water or glycerine may be held out of the original mixture and added at this point.

If, for example, glue and glycerine are used which give a pH of 6.5 to the batch to which no alkaline agents have been added and additional batches be prepared having sufficient caustic soda added to give pH to 7.0, 7.5, 8.0, 8.5, 9.0 and 9.5 and if to each of these batches, there is added .045% formaldehyde and the batches are promptly chilled preferably within less than one hour to a temperature below their melting points and thereafter stored at ordinary room temperature (70°–80° F.) under conditions where loss of any considerable amount of moisture is prevented, there will be a very great difference in the rate at which the hardening action, as measured by increase of melting point, will take place in the various batches.

These batches will all have an initial melting point of from 90–95° F. The results of the addition of formaldehyde to the various batches may be summarized by saying that there will be practically no change in the melting point of the batch of pH 6.5 in seven days and its melting point will increase gradually over a period of several months until the ultimate melting point slightly above 210° F. is reached. The batch of pH 7.0 will reach the ultimate melting point in about one month. The batches of pH 7.5, pH 8.0, pH 8.5 and pH 9.0 will reach a melting point of from 170° F. to 210° F. in about seven days.

The batch having pH 9.5 may not set at all but may remain sticky because of the effect of the high alkalinity on the glue.

If an exactly comparable lot be made up and instead of being cooled immediately after the addition of formaldehyde, these batches be held at a temperature of 140° F. for four hours, the lot of pH 6.5 will behave about the same as the one that was chilled promptly, i. e. it will take months for the reaction between the glue and formaldehyde to be completed as indicated by its reaching the maximum melting point. The reaction will be greatly delayed even in the case of the batches of higher pH which otherwise would react rapidly. For example, after five weeks for batches of pH 8.0, the melting point of the heated batch would be 180° F. and of the unheated batch 217° F. For higher pH the delay will be less but still appreciable. At pH 8.5, for example, the heated batch will have a melting point of 192° F. after five weeks whereas the unheated batch will have a melting point of 219° F.

It will be clear from this detailed statement of experimental evidence that I have discovered a method of accurately controlling the reaction between formaldehyde and glue so as to bring this reaction to substantial completion within a relatively short period. This I do as described above by reducing to a minimum the temperature and time of heating subsequent to the addition of the formaldehyde and by maintaining a relatively high pH in the reaction mixture.

It will be evident that my new process can be applied to the manufacture of many types of formaldehyde-glue or formaldehyde-casein compositions such for example as printer's rolls, hektographs, transparent sheets, masking tape, glue and casein adhesives, photographic films and plates and the various types of glue and casein plastics for all of which purposes my new process is highly advantageous since its use makes it possible to prepare products of predetermined hardness, melting point, or solubility by means conveniently adaptable to large scale manufacturing operations.

I claim:

1. A duplicator sheet comprising a layer of fusible, absorbent, aldehyde-proteid composition having pH of not less than 7.0 nor more than 9.0.

2. A method of accelerating the stabilization of the melting point of a fusible aldehyde proteid composition comprising causing the reaction together of proteid material, aldehyde material, and alkaline material, incorporating such a percentage of aldehyde material as will result in a fusible composition, and incorporating such a percentage of the alkaline material as will result in a composition having a pH of approximately 8.5.

3. A method of accelerating the stabilization of the melting point of a fusible aldehyde proteid composition comprising causing the reaction together of proteid material, aldehyde material, and alkaline material, incorporating such a percentage of aldehyde material as will result in a fusible composition, and incorporating such a percentage of the alkaline material as will result in a composition having a pH not less than 7.0 nor more than 9.0.

4. A method of accelerating the stabilization of the melting point of a fusible aldehyde proteid composition comprising causing the reaction together of proteid material, aldehyde material, and alkaline material, incorporating such a percentage of aldehyde material as will result in a composition fusible below 212° F., and incorporating such a percentage of the alkaline material as will result in a composition having a pH not less than 7.0.

5. A method of accelerating the stabilization of the melting point of a fusible aldehyde proteid composition comprising causing the reaction together of proteid material, aldehyde material, and alkaline material, incorporating such a percentage of aldehyde material as will result in a fusible composition, incorporating such a percentage of the alkaline material as will result in a composition having a pH of approximately 8.5, and cooling the composition shortly after the introduction of the aldehyde material.

6. A method of accelerating the stabilization of the melting point of a fusible aldehyde proteid composition comprising causing the reaction together of proteid material, aldehyde material, and alkaline material, incorporating such a percentage of aldehyde material as will result in a fusible composition, incorporating such a percentage of the alkaline material as will result in a composition having a pH of approximately 8.5, and cooling the composition below its melting point shortly after the introduction of the aldehyde material.

7. A method of accelerating the stabilization of a fusible glue-glycerine composition comprising dissolving approximately 10 pounds of commercial glue in 25 pounds of water, mixing in approximately 65 pounds of glycerine, maintaining the mixture at a temperature somewhat above its melting point, dissolving a quantity of formaldehyde in a mixture of water and glycerine, adding formaldehyde and caustic soda to the mixture of glue and glycerine, the amount of formaldehyde used being approximately .045 by weight of the entire mixture, the amount of causic soda used being sufficient to give a pH of approximately 8.5 to the mixture, and chilling the resulting mixture within less than one hour of the making of the mixture to a temperature below the melting point.

8. A method of accelerating the stabilization of the melting point of a fusible aldehyde glue-glycerine composition comprising causing the reaction together of glue-glycerine material, aldehyde material, and alkaline material, incorporating such a percentage of aldehyde material as will result in a fusible composition, and incorporating such a percentage of the alkaline material as will result in a composition having a pH of approximately 8.5.

9. A duplicator sheet comprising a layer of fusible, absorbent, aldehyde-glue-glycerine composition having pH of not less than 7.0 nor more than 9.0.

10. A duplicator sheet comprising a layer of fusible, absorbent, aldehyde-glue-glycerine composition having pH of not less than 7.0 nor more than 9.0 and a melting point of not more than 212° F.

11. A duplicator sheet comprising a layer of fusible, absorbent, aldehyde-proteid composition having pH of not less than 7.0 nor more than 9.0 and a melting point of not more than 212° F.

ERIK ROSENBERG NIELSEN.